(12) United States Patent
Reymond et al.

(10) Patent No.: US 9,494,717 B2
(45) Date of Patent: Nov. 15, 2016

(54) TRANSPARENT SUBSTRATE PROVIDED WITH A THIN-FILM MULTILAYER

(75) Inventors: Vincent Reymond, Antony (FR); Ramzi Jribi, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 81 days.

(21) Appl. No.: 14/007,135

(22) PCT Filed: Mar. 19, 2012

(86) PCT No.: PCT/FR2012/050567
§ 371 (c)(1),
(2), (4) Date: Sep. 24, 2013

(87) PCT Pub. No.: WO2012/127162
PCT Pub. Date: Sep. 27, 2012

(65) Prior Publication Data
US 2014/0022630 A1    Jan. 23, 2014

(30) Foreign Application Priority Data
Mar. 24, 2011    (FR) .................... 11 52462

(51) Int. Cl.
| | |
|---|---|
| *F21V 9/04* | (2006.01) |
| *F21V 9/06* | (2006.01) |
| *G02B 5/08* | (2006.01) |
| *C03C 17/36* | (2006.01) |

(52) U.S. Cl.
CPC ............ *G02B 5/0858* (2013.01); *C03C 17/36* (2013.01); *C03C 17/366* (2013.01);
(Continued)

(58) Field of Classification Search
CPC ..... G02B 1/00; C03C 17/36; C03C 17/3613; C03C 17/3626; C03C 17/3634; C03C 17/3639; C03C 17/3644; C03C 17/3649; C03C 17/3657; C03C 17/3681; C03C 17/3684
See application file for complete search history.

(56) References Cited

U.S. PATENT DOCUMENTS 6,589,658 B1 *   7/2003   Stachowiak .................. 428/432
2011/0210656 A1 *   9/2011   Lemmer et al. .............. 312/405
(Continued)

FOREIGN PATENT DOCUMENTS

| DE | 197 51 711 | 5/1999 |
|---|---|---|
| FR | 2 940 272 | 6/2010 |

(Continued)

OTHER PUBLICATIONS

Glaser, H. J., " Verglasungen mit Warmedammschicht auf der Aussenseite", Duennfilmtechnologie Auf Flachglas, Verlag Karl Hofmann, pp. 185-200, XP 007919680, (Jan. 1, 1999).
(Continued)

*Primary Examiner* — Scott J Sugarman
*Assistant Examiner* — Robert E Tallman
(74) *Attorney, Agent, or Firm* — Oblon, McClelland, Maier & Neustadt, L.L.P.

(57) ABSTRACT

The invention relates to a transparent substrate provided with a thin-film multilayer comprising a metallic layer having infrared-reflection properties located between two, subjacent and superjacent, nonmetallic dielectric coatings, the superjacent dielectric coating comprising the sequence of thin layers deposited in the following order:
 at least one high-refractive-index layer, the physical thickness of the high-refractive-index layer or the sum of the physical thicknesses of the high-refractive-index layers lying between 15 and 40 nm; and
 at least one low-refractive-index layer, the physical thickness of the low-refractive-index layer or the sum of the physical thicknesses of the low-refractive-index layers lying between 40 and 120 nm,
the refractive index difference between the one or more high-refractive-index layers and the one or more low-refractive-index layers lying between 0.7 and 1.2, preferably between 0.8 and 1.1.
The invention allows the solar factor of a multiple glazing unit to be increased, and an acceptable color, especially in transmission, which is in particular less green, even also less yellow, to be obtained for a multiple glazing unit.

18 Claims, 1 Drawing Sheet

(52) U.S. Cl.
CPC ...... *C03C 17/3618* (2013.01); *C03C 17/3626* (2013.01); *C03C 17/3644* (2013.01); *C03C 17/3681* (2013.01); *C03C 2217/734* (2013.01)

(56) References Cited

U.S. PATENT DOCUMENTS

2011/0305853 A1* 12/2011 Reymond et al. ............. 428/34
2012/0028009 A1    2/2012 Gerardin et al.
2012/0225224 A1*  9/2012 Blacker et al. ............... 428/34

FOREIGN PATENT DOCUMENTS

FR    2 942 794     9/2010
WO    03 048061    6/2003

OTHER PUBLICATIONS

International Search Report Issued Jul. 19, 2012 in PCT/FR12/050567 Filed Mar. 19, 2012.

* cited by examiner

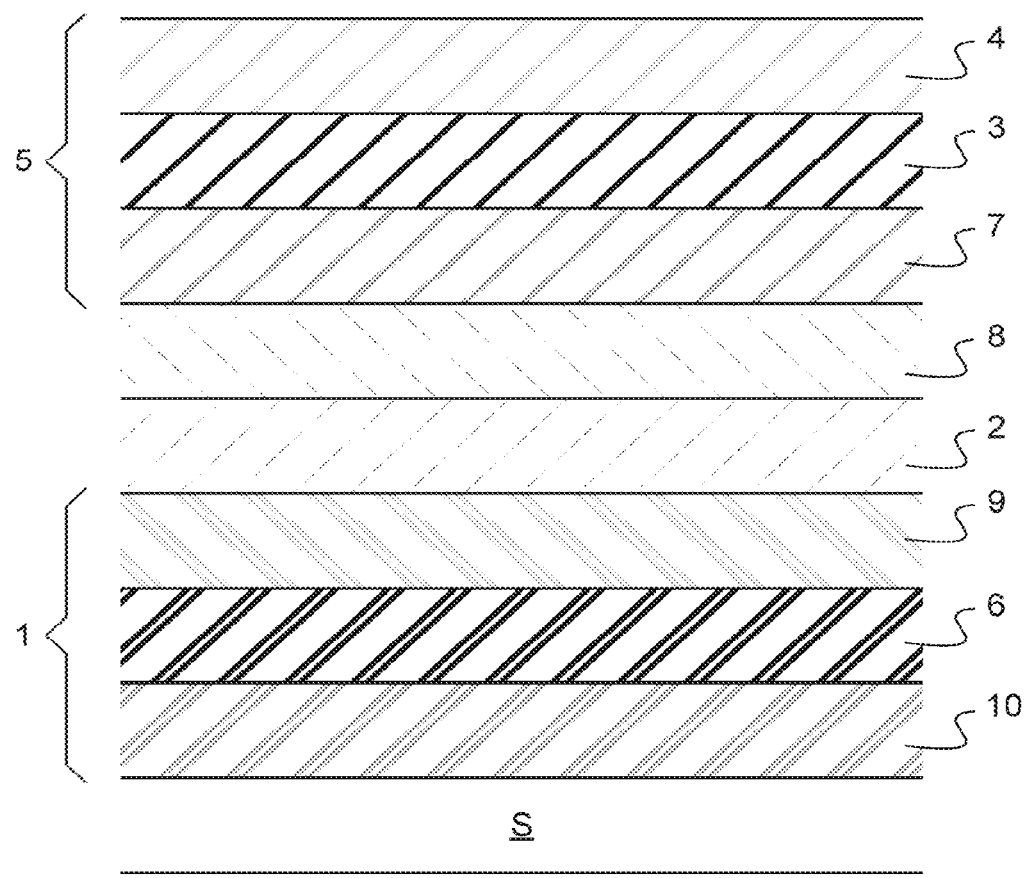

TRANSPARENT SUBSTRATE PROVIDED WITH A THIN-FILM MULTILAYER

CROSS REFERENCE TO RELATED APPLICATIONS

The present application is a 35 U.S.C. §371 national stage patent application of International patent application PCT/FR2012/050567, filed on Mar. 19, 2012, published as WO 2012/127162 on Sep. 27, 2012, the text of which is incorporated by reference, and claims the benefit of the filing date of French application no. 1152462, filed on Mar. 24, 2011, the text of which is also incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF THE MATERIAL ON THE COMPACT DISC

Not Applicable.

BACKGROUND OF THE INVENTION

1. Field of the Invention

The invention relates to a transparent substrate, especially made of a rigid mineral material such as glass, coated with a thin-film multilayer that includes a functional layer of the metallic type able to act on solar radiation and/or long-wavelength infrared radiation.

The invention more particularly relates to the use of such substrates in the manufacture of improved thermal insulation glazing units having a high solar factor, and therefore mainly intended for cold climates. These glazing units are more particularly intended to equip buildings, especially with a view to making the building easier to heat in winter ("low-E" glazing units) and maximizing solar heating, which costs nothing.

In such improved multiple thermal insulation glazing units, substrates are kept a certain distance apart by spacers so as to define a cavity that is filled with an insulating gas, which may possibly be air, argon or krypton. A double glazing unit therefore comprises at least two substrates, for example glass sheets, separated pairwise by a gas-filled cavity. Thus, for example, the sequence 4/12/4 denotes a double glazing unit composed of two 4 mm-thick glass sheets and a 12 mm-thick gas-filled cavity and the sequence 4/12/4/12/4 denotes a triple glazing unit composed of three 4 mm-thick glass sheets and two 12 mm-thick gas-filled cavities.

2. Description of the Related Art Including Information Disclosed Under 37 CFR 1.97 and 1.98

Conventionally, the faces of a multiple glazing unit are numbered starting from outside the building. A double glazing unit thus comprises 4 faces, face 1 lying outside the building, face 4 lying inside the building and faces 2 and 3 lying inside the double glazing unit. Likewise, a triple glazing unit comprises 6 faces, face 1 lying outside the building, face 6 lying inside the building, faces 2 and 3 lying on each side of the first gas-filled cavity, inside the triple glazing unit, and faces 4 and 5 lying on each side of the second gas-filled cavity, inside the triple glazing unit.

These substrates may moreover be integrated into glazing units furthermore having particular functionalities, such as for example heating glazing units or electrochromic glazing units.

A thin-film multilayer known to provide substrates with such thermal insulation properties consists of a functional metallic layer having infrared-reflection and/or solar-radiation-reflection properties, especially a functional metallic layer based on silver or a silver-containing metal alloy.

In this type of multilayer, the functional layer is thus located between two antireflection coatings, each coating in general comprising a number of layers that are each made of a dielectric material, such as a nitride type, and especially silicon or aluminum nitride type, or an oxide type. From the optical point of view, the aim of these coatings that flank the functional metallic layer is to make this functional metallic layer "antireflective" in the visible range, so as to preserve a high transmission in the visible range.

A blocker coating is sometimes interposed between one or each antireflection coating and the functional metallic layer. The blocker coating located under, in the substrate direction, the functional layer protects said layer during any possible high-temperature heat treatment, such as bending and/or tempering, and the blocker coating located on the functional layer, opposite the substrate, protects this functional metallic layer from degradation liable to occur during the deposition of the upper antireflection coating and during any possible high-temperature heat treatment, such as bending and/or tempering.

It is known to use two dielectric layers having a refractive index near 2 (conventionally measured at a wavelength of 550 nm), for example a silicon nitride ($Si_3N_4$) layer surmounted by a mixed tin zinc oxide ($SnZnO_x$) layer, above the functional metallic layer to make the functional metallic layer antireflective.

However, a triple glazing unit provided with such multilayers has a limited solar factor and/or has a yellow/green color, in particular in transmission, which cannot be judged to be sufficiently neutral.

There is therefore a need for a transparent substrate provided with a thin-film multilayer, the thin-film multilayer comprising a metallic layer having infrared-reflection properties, located between two, subjacent and superjacent, nonmetallic dielectric coatings, thereby allowing the solar factor of a multiple glazing unit provided with the substrate to be increased, and an acceptable color, especially in transmission, which is in particular less green, even also less yellow, to be obtained for the multiple glazing unit.

BRIEF SUMMARY OF THE INVENTION

To do this, the invention provides a transparent substrate, especially a transparent glass substrate, provided with a thin-film multilayer, the thin-film multilayer comprising a single metallic layer having infrared-reflection, especially low-E, properties, located between two, subjacent and superjacent, nonmetallic dielectric coatings, the superjacent dielectric coating comprising at least the sequence of thin layers deposited, above the metallic layer having infrared-reflection properties, in the following order:

at least one high-refractive-index layer, made of a material having a refractive index greater than or equal to 2.20, the physical thickness of the high-refractive-index layer or the sum of the physical thicknesses of the high-refractive-index layers lying between 15 and 40 nm and preferably between 20 and 35 nm; and at least one low-refractive-index layer, made of a material having a refractive index less than or equal to 1.70, the physical thickness of the low-refractive-index layer or the sum of the physical thicknesses of the low-refractive-index layers lying between 40 and 120 nm, the refractive index difference between the one or more high-refractive-index layers and the one or more low-refractive-index layers lying between 0.7 and 1.2, preferably between 0.8 and 1.1.

According to another feature, the ratio of the physical thickness of the low-refractive-index layer or the sum of the physical thicknesses of the low-refractive-index layers to the physical thickness of the high-refractive-index layer or the sum of the physical thicknesses of the high-refractive-index layers of the superjacent dielectric coating lies between 2.5 and 5.0 and preferably between 2.5 and 4.0.

According to another feature, the ratio of the total optical thickness of the superjacent dielectric coating to the total optical thickness of the subjacent coating lies between 1.8 and 2.3 and preferably between 1.9 and 2.2.

According to another feature, the metallic layer having infrared-reflection properties is based on silver or a silver-containing metal alloy.

According to another feature, the metallic layer having infrared-reflection properties has a physical thickness of between 5 and 20 nm, preferably of between 5 and 15 nm, and more preferably of between 5 and 10 nm.

According to another feature, the one or more high-refractive-index layers of the superjacent dielectric coating preferably have a refractive index that is strictly greater than 2.30 and more preferably greater than or equal to 2.35, and are based on titanium oxide or a mixed oxide of titanium and another element chosen from the group consisting of Zn, Zr and Sn, or based on zirconium oxide or based on niobium oxide or based on mixed silicon zirconium nitride or based on mixed silicon, zirconium and aluminum nitride.

According to another feature, the physical thickness of the low-refractive-index layer of the superjacent dielectric coating or the sum of the physical thicknesses of the low-refractive-index layers of the superjacent dielectric coating lies between 50 and 120 nm, preferably between 75 and 120 nm, and more preferably between 80 and 110 nm.

According to another feature, the one or more low-refractive-index layers of the superjacent dielectric coating essentially consist of silicon oxide.

According to another feature, the subjacent coating furthermore comprises at least one high-refractive-index layer made of a material having a refractive index greater than or equal to 2.20, preferably strictly greater than 2.30, and more preferably greater than or equal to 2.35, the physical thickness of the high-refractive-index layer or the sum of the physical thicknesses of the high-refractive-index layers lying between 10 and 40 nm, preferably between 15 and 40 nm and more preferably between 15 and 30 nm.

According to another feature, the one or more high-refractive-index layers of the subjacent dielectric coating are based on titanium oxide or a mixed oxide of titanium and another element chosen from the group consisting of Zn, Zr and Sn, or based on zirconium oxide or based on niobium oxide or based on mixed silicon zirconium nitride or based on mixed silicon, zirconium and aluminum nitride.

According to another feature, the superjacent dielectric coating furthermore comprises a layer made of a material having a refractive index less than or equal to 2.20 and greater than or equal to 1.80 located between the metallic layer having infrared-reflection properties and the high-refractive index layer of the superjacent dielectric coating.

According to another feature, the layer made of a material having a refractive index less than or equal to 2.20 and greater than or equal to 1.80 is based on zinc oxide, preferably aluminum-doped zinc oxide, or on tin oxide or mixed tin zinc oxide.

According to another feature, the transparent substrate furthermore comprises an overblocker layer made of NiCr or Ti or Nb, located between the metallic layer having infrared-reflection properties and the superjacent dielectric coating, and in direct contact with the metallic layer having infrared-reflection properties.

According to another feature, the subjacent dielectric coating furthermore comprises a wetting layer based on zinc oxide, preferably aluminum-doped zinc oxide, or on tin oxide or mixed tin zinc oxide, with which the metallic layer having infrared-reflection properties is in direct contact.

According to another feature, the subjacent dielectric coating furthermore comprises, as the first layer in direct contact with the substrate material, a layer having a refractive index of between 1.70 and 2.30, preferably based on a nitride, especially aluminum-doped silicon nitride.

The invention also relates to a multiple glazing unit comprising a total number N of substrates, N−1 of which substrates are substrates as claimed in any one of claims 1 to 14, N being greater than or equal to 2 and the N substrates being separated pairwise by a gas-filled cavity, and the thin-film multilayer(s) facing a gas-filled cavity.

According to another feature, at least one of the substrates is a laminated glazing pane comprising two glass sheets joined together by an interlayer polymer film, for example made of PVB.

According to another feature, the external face of the multiple glazing unit, which face is intended to be turned toward the exterior of a building, comprises a self-cleaning and/or anticondensation coating and/or the external face of the multiple glazing unit, which face is intended to be turned toward the interior of a building, comprises a low-E coating.

The term "coating" must be understood, in the context of the present invention, to mean a coating possibly containing therein a single layer or a number of layers of various materials.

When a layer is said to be in direct contact with another layer, it is to be understood, in the context of the invention, that no layer is intermediate between said two layers.

Refractive index measurements were all performed, as is conventional, at a wavelength of 550 nm.

The expression "optical thickness" is understood, in the context of the invention, to mean, as it is conventionally understood to mean, the product of the physical (or actual) thickness of the layer and its refractive index measured at 550 nm.

The expression "total optical thickness" is understood, in the context of the invention, to mean the sum of all the optical thicknesses of the layers considered, each optical thickness being, as explained above, the product of the physical (or actual) thickness of the layer and its refractive index measured at 550 nm.

Thus, the total optical thickness of the subjacent antireflection coating is the sum of all the optical thicknesses of the dielectric layers of this coating, which layers are located between the substrate and the functional metallic layer, or between the substrate and the underblocker coating if it is present.

Likewise, the total optical thickness of the superjacent antireflection coating is the sum of all the optical thicknesses of the dielectric layers of this coating, which layers are located on the functional metallic layer, opposite the substrate, or on the overblocker coating if it is present.

The solar factor g is defined as the ratio of the energy entering into a room via the glazing unit to the incident solar energy. It may be calculated by adding the energy flux transmitted directly through the glazing unit and the energy flux absorbed and then reemitted toward the interior by the glazing unit. The solar factor g, also called the SF coefficient, is measured, in the context of the invention, under the conditions described in international standard ISO 9050.

The term "substrate" is understood, in the context of the present invention, to mean a single glass sheet or a set of glass sheets, especially two glass sheets, joined together in what is called a laminated structure by a polymer interlayer, especially a PVB (polyvinyl butyral) interlayer, using techniques well known in the field.

BRIEF DESCRIPTION OF THE SEVERAL VIEWS OF THE DRAWINGS

FIG. 1: A thin-film multilayer according to the invention that includes: 1 a subjacent nonmetallic dielectric coating; 2 a metallic layer having infrared-reflection properties; 3 a high-refractive-index layer of the superjacent dielectric coating, made of a material having a refractive index greater than or equal to 2.20; 4 a low-refractive-index layer of the superjacent dielectric coating, made of a material having a refractive index less than or equal to 1.70; 5 a superjacent nonmetallic dielectric coating; 6 high-refractive-index layer of the subjacent dielectric coating; 7 a layer of the superjacent coating, made of a material having a refractive index less than or equal to 2.20 and greater than or equal to 1.80; 8 an overblocker layer; 9 a wetting layer of the subjacent dielectric coating; 10 a layer of the subjacent dielectric coating, having a refractive index of between 1.70 and 2.30; and S a substrate material.

DETAILED DESCRIPTION OF THE INVENTION

The invention relates to a transparent substrate, especially a glass substrate, provided with a thin-film multilayer. The thin-film multilayer comprises a metallic layer having infrared-reflection, especially low-E, properties, located between two, subjacent and superjacent, nonmetallic dielectric coatings. The superjacent dielectric coating comprising at least the sequence of thin layers deposited, above the metallic layer having infrared-reflection properties, in the following order:
  at least one high-refractive-index layer, made of a material having a refractive index greater than or equal to 2.20, the physical thickness of the high-refractive-index layer or the sum of the physical thicknesses of the high-refractive-index layers lying between 15 and 40 nm and preferably between 20 and 35 nm; and
  at least one low-refractive-index layer, made of a material having a refractive index less than or equal to 1.70, the physical thickness of the low-refractive-index layer or the sum of the physical thicknesses of the low-refractive-index layers lying between 40 and 120 nm and preferably between 50 and 110 nm,
the refractive index difference between the one or more high-refractive-index layers and the one or more low-refractive-index layers lying between 0.70 and 1.20, preferably between 0.80 and 1.10.

All the features of the invention, in particular replacing two layers having a refractive index near 2 with one or more high-refractive-index layers surmounted by one or more low-refractive-index layers in the superjacent dielectric coating, allow a multiple glazing unit provided with at least one substrate according to the invention to have an increased solar factor and a more neutral color in transmission. This will be illustrated below.

Thus, the invention relates to a transparent substrate intended to be mounted in a glazing unit, for example an architectural glazing unit. The transparent substrate is preferably made of glass. It is coated with a thin-film multilayer. The layers are deposited on top of one another in order to form a metallic layer having infrared-reflection properties sandwiched between two nonmetallic dielectric coatings. There is only one metallic layer having infrared-reflection properties.

The thin layers are deposited by reactive magnetron sputtering, optionally combined with PECVD (plasma enhanced chemical vapor deposition) so as to deposit certain thin layers more rapidly, in particular the low-refractive-index layer.

The first layer deposited directly on the substrate is preferably a layer having a refractive index of between 1.70 and 2.30, preferably a nitride-based layer, especially a silicon-nitride-based layer. One of the roles of this layer, in addition to its optical role described above, is to improve adhesion of the thin-film multilayer to the substrate material. This layer has a physical thickness of between 15 and 40 nm, preferably between 20 and 40 nm.

The metallic layer having infrared-reflection properties is preferably based on silver or a silver-containing metal alloy. It has a physical thickness of between 5 and 20 nm, preferably of between 5 and 15 nm, and more preferably of between 5 and 10 nm.

The superjacent dielectric coating comprises at least one high-refractive-index layer, made of a material having a refractive index greater than or equal to 2.20, preferably strictly greater than 2.30, and more preferably greater than or equal to 2.35. The physical thickness of the high-refractive-index layer or the sum of the physical thicknesses of the high-refractive-index layers lies between 15 and 40 nm and preferably between 20 and 35 nm. These one or more high-refractive-index layers are for example based on titanium oxide or a mixed oxide of titanium and another element chosen from the group consisting of Zn, Zr and Sn, or based on zirconium oxide or based on niobium oxide or based on mixed silicon zirconium nitride or based on mixed silicon, zirconium and aluminum nitride.

The superjacent dielectric coating also comprises, above the one or more high-refractive-index layers, at least one low-refractive-index layer, made of a material having a refractive index less than or equal to 1.70. The physical thickness of the low-refractive-index layer or the sum of the physical thicknesses of the low-refractive-index layers lies between 40 and 120 nm, for example between 50 and 120 nm, preferably between 75 and 120 nm, and more preferably between 80 and 110 nm. These one or more low-refractive-index layers are for example made essentially of silicon oxide, i.e. they consist of more than 80 wt % simple silicon oxide of formula $SiO_2$, and optionally of at least one other element, preferably chosen from the group consisting of Al, C, N, B, Sn, Zn and much more preferably from Al, B or C. Preferably, said one or more layers made essentially of silicon oxide consist of more than 90 wt % simple silicon oxide of formula $SiO_2$.

In the case where there is a plurality of high-refractive-index layers in the superjacent coating, the high-refractive-index layers are preferably all below (starting from the glass) the one or more low-refractive-index layers and the high-refractive-index layers are preferably all in direct contact with one another. However, if they are not in direct contact with one another, they are separated by a layer the refractive index of which is neither less than or equal to 1.70 nor greater than or equal to 2.20, the physical thickness of each of these one or more separating layers being less than or equal to 30 nm and preferably less than or equal to 20 nm.

Likewise, in the case where there is a plurality of low-refractive-index layers in the superjacent coating, the low-refractive-index layers are preferably all above (starting from the glass) the one or more high-refractive-index layers and the low-refractive-index layers are preferably all in direct contact with one another. However, if they are not in direct contact with one another, they are separated by a layer the refractive index of which is neither less than or equal to 1.70 nor greater than or equal to 2.20, the physical thickness of each of these one or more separating layers being less than or equal to 30 nm and preferably less than or equal to 20 nm.

The high-refractive-index layer or group of high-refractive index layers of the superjacent dielectric coating may be separated from the low-refractive-index layer or group of low-refractive-index layers of the superjacent dielectric coating by one or more other layers. However, preferably, the layers or groups of layers are in direct contact. In the case where the layers or groups of layers are not in direct contact, the layers or groups of layers are separated by a layer the refractive index of which is neither less than or equal to 1.70 nor greater than or equal to 2.20, the physical thickness of this separating layer being less than or equal to 30 nm and preferably less than or equal to 20 nm.

The superjacent dielectric coating optionally comprises a layer made of a material having a refractive index less than or equal to 2.20 and greater than or equal to 1.80, located between the metallic layer having infrared-reflection properties and the high-refractive-index layer of the superjacent dielectric coating. The layer made of a material having a refractive index less than 2.20 and greater than or equal to 1.80 is preferably based on zinc oxide, tin oxide or mixed tin zinc oxide. The layer made of a material having a refractive index less than or equal to 2.20 and greater than or equal to 1.80 has a physical thickness of between 4 and 15 nm.

The thin-film multilayer preferably also comprises a blocker layer made of NiCr or Ti or Nb (optionally partially or completely oxidized), located between the metallic layer having infrared-reflection properties and the superjacent dielectric coating, and in direct contact with the metallic layer having infrared-reflection properties, so as to protect the functional metallic layer from possible degradation during deposition of the superjacent antireflection coating and during a possible high-temperature heat treatment, such as bending and/or tempering. The blocker layer has a physical thickness less than or equal to 2 nm.

The subjacent dielectric coating preferably comprises, above the first layer depending on the circumstance, at least one high-refractive-index layer made of a material having a refractive index greater than or equal to 2.20, preferably strictly greater than 2.30, and more preferably greater than or equal to 2.35. The physical thickness of the high-refractive-index layer or the sum of the physical thicknesses of the high-refractive-index layers located in the subjacent coating lies between 10 and 40 nm, preferably between 15 and 40 nm, and more preferably between 15 and 30 nm. These one or more high-refractive-index layers allow the functional metallic layer to be made as antireflective as possible. The one or more high-refractive-index layers of the subjacent dielectric coating are made of titanium oxide or a mixed oxide of titanium and another element chosen from the group consisting of Zn, Zr and Sn, or based on zirconium oxide or based on niobium oxide or based on mixed silicon zirconium nitride or based on mixed silicon, zirconium and aluminum nitride.

In the case where there is a plurality of high-refractive-index layers in the subjacent coating, the high-refractive-index layers preferably are all in direct contact with one another. However, if they are not in direct contact with one another, they are separated by a layer the refractive index of which is neither less than or equal to 1.70 nor greater than or equal to 2.20, the physical thickness of each of these one or more separating layers being less than or equal to 30 nm and preferably less than or equal to 20 nm.

The subjacent dielectric coating also preferably comprises a wetting layer based on zinc oxide, preferably aluminum-doped zinc oxide, or on tin oxide or mixed tin zinc oxide, with which the metallic layer having infrared-reflection properties is in direct contact. This wetting layer allows the metallic layer having infrared-reflection properties to adhere properly to the subjacent dielectric coating and, above all, allows this metallic layer having infrared-reflection properties to crystallize optimally, thus obtaining a high conductivity and a low emissivity.

The high-refractive-index layers of the superjacent and subjacent dielectric coatings may not be strictly stoichiometric and may be substoichiometric or superstoichiometric in oxygen (if they are oxides) or in nitrogen (if they are nitrides).

In addition, the refractive index difference between the one or more high-refractive-index layers and the one or more low-refractive-index layers of the superjacent dielectric coating lies between 0.70 and 1.20, preferably between 0.80 and 1.10.

To obtain a high solar factor and neutral colors in transmission, it is advantageous for the ratio E of the physical thickness of the low-refractive-index layer or the sum of the physical thicknesses of the low-refractive-index layers to the physical thickness of the high-refractive-index layer or the sum of the physical thicknesses of the high-refractive-index layers of the superjacent dielectric coating to lie between 2.5 and 5.0 and preferably between 2.5 and 4.0. The inventors have demonstrated that, when E lies between 3.0 and 5.0, the color in transmission is more neutral. The inventors have also demonstrated that the solar factor is maximized when the ratio E lies between 2.2 and 4.0.

To obtain a high solar factor and neutral colors in transmission, it is also advantageous for the ratio F of the total optical thickness of the superjacent dielectric coating to the total optical thickness of the subjacent dielectric coating to lie between 1.8 and 2.3 and preferably between 1.9 and 2.2.

The inventors deposited thin layers on 4 mm-thick clear soda-lime glass substrates, marketed under the tradename Planilux® by the Applicant company. Thin-film multilayers were respectively located on faces 2 and 5 of a triple glazing unit, i.e. on the internal faces of the external glass sheets. Each of the triple glazing units thus comprised two external glass sheets provided with a thin-film multilayer on faces 2 and 5 and an uncoated central glass sheet. The thin-film multilayers on faces 2 and 5 were identical. All the triple glazing units assembled in examples 1 to 4 had the 4/12(90% Ar)/4/12(90% Ar)/4 configuration, i.e. they consisted of three 4 mm-thick transparent Planilux® glass sheets separated pairwise by a 12 mm-thick intermediate gas-filled cavity comprising 90% argon and 10% air, the whole assembly being held together by a frame structure and spacers.

Table 1 below collates the general magnetron sputtering deposition conditions under which the various layers of examples 1 to 4 were deposited:

TABLE 1

| Layer | Target employed | Deposition pressure | Gas |
|---|---|---|---|
| $Si_3N_4$ | 92:8 wt % Si:Al | $1.5 \times 10^{-3}$ mbar | 45% $Ar/(Ar + N_2)$ |
| $TiO_2$ | $TiO_x$ where x was about 1.9 | $1.5 \times 10^{-3}$ mbar | 95% $Ar/(Ar + O_2)$ |
| $SnZnSbO_x$ | 34:65:1 wt % Sn:Zn:Sb | $2 \times 10^{-3}$ mbar | 58% $Ar/(Ar + O_2)$ |
| ZnO | 98:2 wt % Zn:Al | $2 \times 10^{-3}$ mbar | 52% $Ar/(Ar + O_2)$ |
| NiCr | 80:20 wt % NiCr | $2 \times 10^{-3}$ mbar | 100% Ar |
| Ag | Ag | $4 \times 10^{-3}$ mbar | 100% Ar |
| $SiO_2$ | 92:8 wt % Si:Al | $2 \times 10^{-3}$ mbar | 70% $Ar/(Ar + O_2)$ |

Triple glazing unit No. 1 comprised two glass sheets provided with a known prior-art thin-film multilayer, whereas triple glazing units Nos. 2, 3 and 4 comprised two substrates according to the invention as glass sheets.

Table 2 shows, for each example, the composition, the order and the physical thickness of the thin layers in the multilayer of each glass sheet, and the refractive index at 550 nm of the dielectric materials. The notation ":Al" to the right of a compound means that said compound was doped with aluminum.

TABLE 2

| Composition | Refractive index | No. 1 | No. 2 | No. 3 | No. 4 |
|---|---|---|---|---|---|
| $SiO_2$:Al | 1.48 | 0 | 85 nm | 100 nm | 109.5 nm |
| $ZnSnO_x$ | 2.00 | 3 nm | 0 | 0 | 0 |
| $Si_3N_4$:Al | 2.05 | 46.5 nm | 0 | 0 | 0 |
| $TiO_2$ | 2.40 | 0 | 29 nm | 27 nm | 28 nm |
| ZnO:Al | 1.90 | 5 nm | 5 nm | 5 nm | 5 nm |
| NiCr | | 0.5 nm | 0.5 nm | 0.5 nm | 0.5 nm |
| Ag | | 6.6 nm | 6.6 nm | 6.6 nm | 6.6 nm |
| ZnO:Al | 1.90 | 5 nm | 5 nm | 5 nm | 5 nm |
| $TiO_2$ | 2.40 | 16 nm | 20 nm | 20 nm | 23.5 nm |
| $Si_3N_4$:Al | 2.05 | 25 nm | 25 nm | 25 nm | 23.5 nm |
| Glass | | 4 nm | 4 nm | 4 nm | 4 nm |

Table 3 shows that the substrates of triple glazing units Nos. 2, 3 and 4 were indeed in accordance with the invention, i.e. they indeed satisfied the various conditions defined above.

Thus, from table 3, the refractive index difference between the high-refractive-index layer and the low-refractive-index layer, equal to 0.95, indeed lay between 0.70 and 1.20, and preferably between 0.80 and 1.10, for the substrate according to the invention, in contrast to the glass sheet provided with a known prior-art multilayer for which this difference was zero, this multilayer comprising neither a high-refractive-index layer nor a low-refractive-index layer.

Likewise, from table 3, the ratio E of the physical thickness of the low-refractive-index layer to the physical thickness of the high-refractive-index layer of the superjacent dielectric coating lay between 2.5 and 5.0, preferably between 2.5 and 4.0.

Finally, the ratio F of the total optical thickness of the superjacent dielectric coating to the total optical thickness of the subjacent coating lay between 1.8 and 2.3, preferably between 1.9 and 2.2, in contrast to the glass sheet provided with a known prior-art multilayer for which this ratio F was 1.1.

TABLE 3

| | Triple glazing unit No. | | | |
|---|---|---|---|---|
| | No. 1 | No. 2 | No. 3 | No. 4 |
| High/low index difference | 0 | 0.95 | 0.95 | 0.95 |
| E | — | 2.9 | 3.7 | 3.9 |
| F | 1.1 | 1.9 | 2.0 | 2.1 |

Table 4 shows that the conditions defined above allowed the aim of the invention, which is to increase the solar factor and make the color in transmission of a triple glazing unit more neutral, to be achieved. The factors a*T and b*T are representative of the color in transmission. The colors in transmission were measured in the LAB system under illuminant D65 at 2°. The closer a*T and b*T are to zero, the more neutral the color. Table 4 also mentions the factors a*R and b*R, which are representative of the color in reflection of the triple glazing unit, measured at an angle of 0° and 60°. The colors in reflection were also measured in the LAB system under illuminant D65 at 2°.

Table 4 shows that, relative to triple glazing unit No. 1, the three triple glazing units Nos. 2, 3 and 4 have a significantly increased solar factor.

In addition, the three triple glazing units Nos. 2, 3 and 4 have an improved a*T factor relative to triple glazing unit No. 1, and even greatly improved for triple glazing units Nos. 3 and 4, providing the color in transmission with a less marked green component. Triple glazing unit No. 2 has a slightly degraded b*T factor relative to triple glazing unit No. 1. Triple glazing unit No. 3 has an equivalent b*T factor relative to triple glazing unit No. 1. Furthermore, triple glazing unit No. 4 has a greatly improved b*T factor relative to triple glazing unit No. 1, providing the color in transmission with a less marked yellow component.

TABLE 4

| | Triple glazing unit No. | | | |
|---|---|---|---|---|
| | No. 1 | No. 2 | No. 3 | No. 4 |
| Solar factor g (%) | 60.3 | 63.8 | 63.2 | 62.6 |
| a * T | −3.8 | −3.4 | −2.3 | −1.0 |
| b * T | 2.4 | 2.9 | 2.5 | 0.9 |
| a * R 0° | 0.0 | −0.7 | −3.9 | −8.1 |
| b * R 0° | −2.8 | −3.7 | −3.3 | 0.9 |
| a * R 60° | 0.3 | −1.3 | −4.6 | −8.2 |
| b * R 60° | −3.1 | −3.3 | −2.6 | 1.8 |

Triple glazing unit No. 2 was, of the three triple glazing units tested, the one that had the highest solar factor, but its color in transmission was not improved. Triple glazing unit No. 4 was, of the three triple glazing units tested, the one that had the most neutral colors in transmission, and a good solar factor. However, triple glazing unit No. 4 had a color in reflection at an angle of 60° that was clearly degraded.

There is therefore a compromise to be found between increasing the solar factor and making the colors in transmission more neutral. Thus, triple glazing unit No. 3 gives both good results for the color in transmission and very good results for the solar factor while limiting the degradation in the color in reflection, which remains neutral.

The invention also relates to a multiple glazing unit comprising N substrates, especially glass substrates, N being greater than or equal to 2. N−1 of the substrates are substrates according to the invention and one substrate is an uncoated substrate or a substrate coated with another coating, such as for example a self-cleaning coating. A self-cleaning and/or anticondensation coating may also be present on the opposite face of one of the N−1 substrates according to the invention and on an external face of the multiple glazing unit, turned toward the interior or exterior of the building.

The substrates are separated pairwise by a gas-filled cavity. The one or more thin-film multilayers of the substrates face a gas-filled cavity, the multilayer for example being located on faces 2 and 5 for a triple glazing unit.

One of the substrates may for example consist of a laminated glazing pane comprising two glass sheets joined together by an interlayer polymer film, such as a PVB film.

The external face of the multiple glazing unit, intended to be turned toward the exterior of a building (face 1) may comprise a self-cleaning and/or anticondensation coating. Likewise, the external face of the multiple glazing unit, intended to be turned toward the interior of a building (face 4 of a double glazing unit or face 6 of a triple glazing unit) may comprise a low-E coating. As a variant, the glazing unit may multiple may comprise both a self-cleaning and/or anticondensation coating on face 1 and a low-E coating on its external face intended to be turned toward the interior of a building.

The invention claimed is:

1. A transparent substrate (S), provided with a thin-film multilayer, the thin-film multilayer comprising only one metallic layer (2) having infrared-reflection properties, and two, subjacent (1) and superjacent (5), nonmetallic dielectric coatings, wherein the metallic layer (2) having infrared-reflection properties is located between the two, subjacent (1) and superjacent (5), nonmetallic dielectric coatings, and wherein the superjacent (5) dielectric coating comprises at least the sequence of thin layers deposited, above the metallic layer having infrared-reflection properties, in the following order:
a layer (7) made of a material having a refractive index less than or equal to 2.20 and greater than or equal to 1.80;
at least one high-refractive-index layer (3) made of a material having a refractive index greater than or equal to 2.20, wherein the physical thickness of the high-refractive-index layer (3) or the sum of the physical thicknesses of the high-refractive-index layers (3) of the superjacent (5) dielectric coating is from 15 to 40 nm; and
at least one low-refractive-index layer (4) made of a material having a refractive index less than or equal to 1.70, wherein the physical thickness of the low-refractive-index layer (4) or the sum of the physical thicknesses of the low-refractive-index layers (4) of the superjacent (5) dielectric coating is from 40 to 120 nm,
wherein the refractive index difference between the one or more high-refractive-index layers (3) and the one or more low-refractive-index layers (4) of the superjacent (5) dielectric coating is from 0.7 to 1.2, and
wherein the ratio of the physical thickness of the low-refractive-index layer (4) or the sum of the physical thicknesses of the low-refractive-index layers (4) to the physical thickness of the high-refractive-index layer (3) or the sum of the physical thicknesses of the high-refractive-index layers (3) of the superjacent (5) dielectric coating is from 2.5 to 5.0.

2. The transparent substrate of claim 1, wherein the ratio of the total optical thickness of the superjacent (5) dielectric coating to the total optical thickness of the subjacent (1) coating is from 1.8 and 2.

3. The transparent substrate of claim 1, wherein the metallic layer (2) having infrared-reflection properties is based on silver or a silver-containing metal alloy.

4. The transparent substrate of claim 1, wherein the metallic layer (2) having infrared-reflection properties has a physical thickness of from 5 to 20 nm.

5. The transparent substrate of claim 1, wherein the one or more high-refractive-index layers (3) of the superjacent (5) dielectric coating have a refractive index greater than 2.30, and are based on titanium oxide, a mixed oxide of titanium and an element selected from the group consisting of Zn, Zr, and Sn, zirconium oxide, niobium oxide, a mixed silicon zirconium nitride, or a mixed silicon, zirconium, and aluminum nitride.

6. The transparent substrate of claim 1, wherein the physical thickness of the low-refractive-index layer (4) of the superjacent (5) dielectric coating or the sum of the physical thicknesses of the low-refractive-index layers (4) of the superjacent (5) dielectric coating is from 100 and 120 nm.

7. The transparent substrate of claim 1, wherein the one or more low-refractive-index layers (3) of the superjacent (5) dielectric coating consist essentially of silicon oxide.

8. The transparent substrate of claim 1, wherein the subjacent (1) dielectric coating further comprises at least one high-refractive-index layer (6) made of a material having a refractive index greater than or equal to 2.20, and
wherein the physical thickness of the high-refractive-index layer (6) or the sum of the physical thicknesses of the high-refractive-index layers (6) of the subjacent (1) dielectric coating is from 10 to 40 nm.

9. The transparent substrate of claim 8, wherein the one or more high-refractive-index layers (6) of the subjacent (1) dielectric coating are based on titanium oxide, a mixed oxide of titanium and an element selected from the group consisting of Zn, Zr, and Sn, zirconium oxide, niobium oxide, a mixed silicon zirconium nitride, or a mixed silicon, zirconium, and aluminum nitride.

10. The transparent substrate of claim 1, wherein the layer (7) made of a material having a refractive index less than or equal to 2.20 and greater than or equal to 1.80 is based on zinc oxide.

11. The transparent substrate of claim 1, further comprising:
an overblocker layer (8) made of NiCr, Ti, or Nb, located between the metallic layer (2) having infrared-reflection properties and the superjacent (5) dielectric coating, and in direct contact with the metallic layer (2) having infrared-reflection properties.

12. The transparent substrate of claim 1, wherein the subjacent (1) dielectric coating further comprises a wetting layer (9) based on zinc oxide, tin oxide, or a mixed tin zinc oxide, with which the metallic layer (2) having infrared-reflection properties is in direct contact.

13. The transparent substrate of claim 1, wherein the subjacent (1) dielectric coating further comprises, as the first layer in direct contact with the substrate material, a layer (10) having a refractive index of between 1.70 and 2.30.

14. A multiple glazing unit, comprising a total number N of substrates, N−1 of which substrates are substrates as claimed in claim 1, wherein N is greater than or equal to 2 and the N substrates are separated pairwise by a gas-filled cavity, and the thin-film multilayer(s) facing a gas-filled cavity.

15. The multiple glazing unit of claim 14, wherein at least one of the substrates is a laminated glazing pane comprising two glass sheets joined together by an intermediate polymer layer.

16. The multiple glazing unit of claim 14, wherein its external face which is configured to be turned toward the exterior of a building, comprises a self-cleaning and/or anticondensation coating and/or its external face, which is configured to be turned toward the interior of a building, comprises a low-E coating.

17. The transparent substrate of claim 1, which is a glass substrate.

18. The transparent substrate of claim 1, wherein the ratio of the physical thickness of the low-refractive-index layer (4) or the sum of the physical thicknesses of the low-refractive-index layers (4) to the physical thickness of the high-refractive-index layer (3) or the sum of the physical thicknesses of the high-refractive-index layers (3) of the superjacent (5) dielectric coating is from 2.5 to 4.0.

\* \* \* \* \*